July 13, 1965 E. C. SMITH, JR., ETAL 3,194,985

MULTIPLEXING CIRCUIT WITH FEEDBACK TO A CONSTANT CURRENT SOURCE

Filed July 2, 1962

INVENTOR.
ELROY C. SMITH, JR
JAMES L. THOMAS
BY
Ernest L. Brown
ATTORNEY

United States Patent Office 3,194,985
Patented July 13, 1965

3,194,985
MULTIPLEXING CIRCUIT WITH FEEDBACK TO A CONSTANT CURRENT SOURCE

Elroy C. Smith, Jr., La Mirada, and James L. Thomas, La Habra, Calif., assignors to North American Aviation, Inc.

Filed July 2, 1962, Ser. No. 206,816
7 Claims. (Cl. 307—88.5)

This invention pertains to a multiplexing circuit and more particularly to a multiplexing circuit wherein a plurality of analogue voltages are connected to a number of input terminals and gated to time-share a single output terminal.

In prior known multiplexing circuits which are controlled by a commutating switch or matrix, and the like, the output voltage does not accurately follow the input voltage, or a large number of components are required to correct for errors introduced by the multiplexing circuit.

It is frequently necessary to time-share a particular information carrier with minimum error signals being introduced by the switching circuit. For example, consider a telemetering system wherein separate voltages represent such factors as temperature, humidity, radiation intensity, velocity or other factors. It is common to generate voltages which are each proportional to a separate factor which has been measured and must now be transmitted over a common-time shared radio frequency carrier system such as a pulse code, pulse width or amplitude modulated system.

In a telemetering system a timing circuit is used to switch the input to the modulator from one information source to another. For example, it may be desired to transmit a first signal for one micro-second, a second signal for two micro-seconds, a third signal for five micro-second, a fourth signal for one micro-second, and a fifth signal for a hundred micro-seconds. The device of this invention is adapted to connect one voltage source at a time to the output terminal. In its more preferred embodiment, the device of this invention utilizes a plurality of gates which are controlled to connect a plurality of signals in time-shared relation to a single output terminal pair.

It is desirable that a circuit which commutates or connects various input channels into a single output channel should not introduce errors or offset voltages.

The device contemplated by this invention is adapted to be gated by control signals in a timed sequence to cause various information channels, to be connected consecutively to a single output terminal pair without introducing significant errors or by introducing errors which are smaller than introduced by previously known commutating circuits.

It is an object of this invention to introduce a novel isolation amplifier which is adapted to have a unity voltage gain and to control its input voltage with a controlled current source in such a manner as to reduce the offset voltages of a commutating circuit.

Another object of this invention to control the current flow in a gated diode switch to cause negligible offset voltage to appear between the input and output terminals of the switch.

It is likewise an object of this invention to control the flow of current into the input terminals of an amplifier in response to the voltage appearing at the output of an amplifier.

Other objects will become apparent from the following description taken in connection with the accompanying drawings in which.

Figure 1:
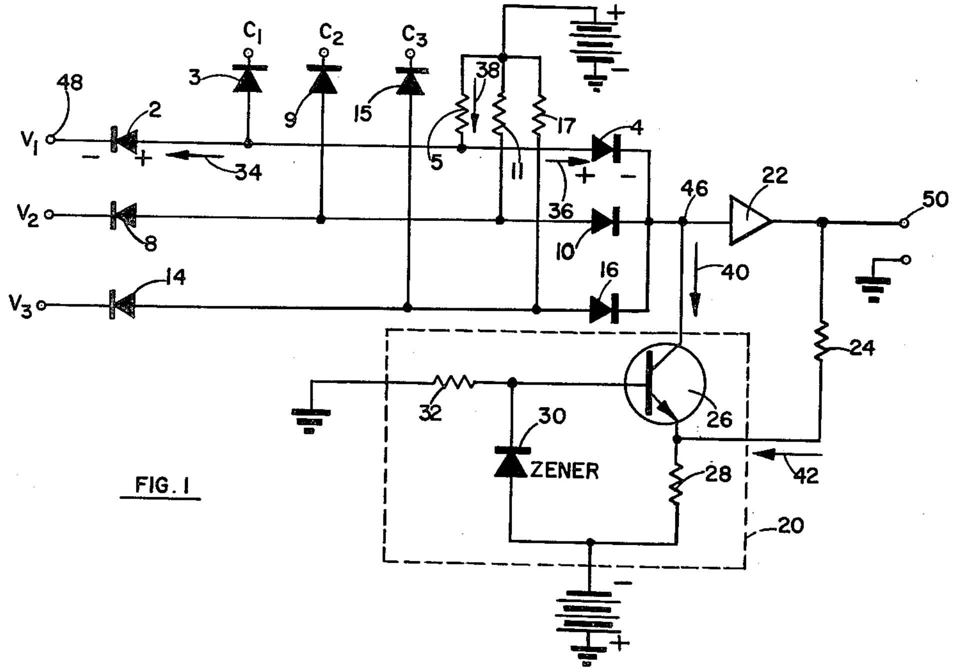
FIG. 1 is a schematic diagram of one embodiment of this invention.

In the embodiment shown in FIG. 1, three input terminals labeled V1, V2 and V3 are adapted to receive voltages from three different sources which are to be switched to an output terminal. It is contemplated by this invention that more or less than three voltage sources may be used, three voltage sources being shown by way of example only.

The first voltage source VI is connected by its positive terminal to terminal 48 and by its negative terminal to the common or ground terminal. The second voltage source is connected to the terminal marked V2 by its positive terminal and to the ground terminal by its negative terminal. The voltage source V3 is connected to the marked terminal by its positive voltage terminal and to the ground terminal by its negative voltage terminal.

Diodes 2 and 4 are a matched pair of diodes. In the preferred embodiment of this invention the voltage-current characteristics of diodes 2 and 4 are substantially identical. Diodes 2 and 4 may, alternatively, have voltage-current characteristics, whereby for a given current the forward voltage across diode 4 is some constant times the voltage which appears acros diode 2 for the same current flow. The anodes of diodes 2 and 4 are connected together to one terminal of a resistor 5 whose other terminal is connected to a source of positive voltage. The last named source of positive voltage has a potential which is greater than the highest potential to be expected at any of the input terminals V1, V2 or V3.

Similarly, a pair of diodes 8 and 10 are matched with their anodes connected together to one terminal of a resistor 11 whose other terminal is connected to a source of positive voltage. Terminal V3 is connected to matched diodes 14 and 16 whose anodes are connected together to one terminal of a resistor 17 and whose other terminal is connected to a source of voltage. The input voltages are connected to the cathodes of diodes 2, 8, and 14, respectively. The cathodes of diodes 4, 10 and 16 are connected together to a common non-grounded terminal 46.

A gating circuit such as a control matrix is connected to the junction of diodes 2 and 4 through a diode 3 whose anode is connected to the anodes of diodes 2 and 4. A control matrix may be also connected through diode 9, whose anode is connected to the anodes of diodes 8 and 10, to control the V2 circuit. Similarly the control matrix may be also connected to a diode 15, whose anode is connected to the anodes of diodes 14 and 16, to control the V3 circuit. When a negative voltage is connected to terminals C1, C2, or C3, diodes 3, 9 or 15 conduct to block V1, V2 or V3 from terminal 46. When terminals C1, C2 or C3 are positive, the particular terminal V1, V2 or V3 is connected through its associated diodes to terminal 46.

Terminal 46 is connected through a current amplifier 22, whose voltage gain is substantially unity, to an output terminal pair 50.

To form a current controller 20, an NPN transistor 26 is connected by its collector to terminal 46 and by its emitter through a resistor 28 to a source of negative voltage. The emitter of transistor 26 is connected through a scaling resistor 24 to the output terminal 50 of amplifier 22. A zener diode is connected by its cathode to the base of transistor 26 and by its anode to said source of negative voltage. A resistor 32 is connected between the base of transistor 26 and the common ground terminal.

Figure 2:
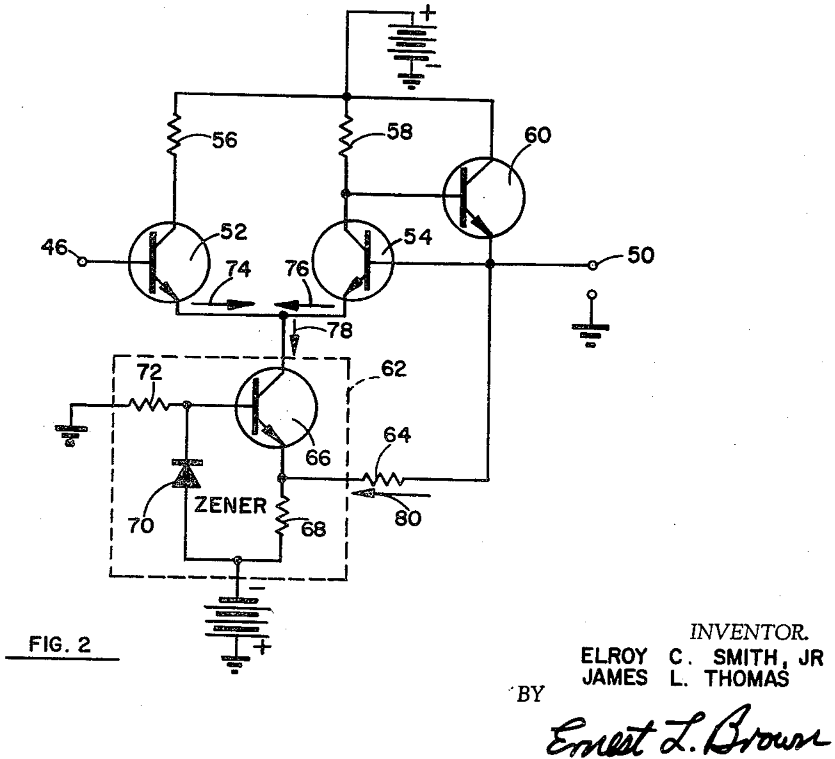
FIG. 2 is a schematic diagram of an amplifier which employs the principles of this invention and which may be employed in the embodiment of the invention illustrated in FIG. 1.

FIG. 2 is a circuit diagram of an amplifier which also employs a controlled current source in accordance with the principles of this invention for equalizing currents through two semiconductor P-N junctions, and which may be substituted for the amplifier 22 in FIG. 1, thereby providing in FIG. 1 a circuit having two independent controlled current sources for equalizing currents through pairs of semiconductor junctions, namely the P-N junctions of switching diode pairs (2, 4; 8, 10; and 14, 16) and the P-N junctions of a differential amplifier. In FIG. 2, terminal 46 is connected to the base of an NPN transistor 52 whose collector is connected through a load resistor 56 to a source of positive voltage. The emitters of matched NPN transistors 52 and 54 are connected together to the collector of an NPN transistor 66 of current controller 62. Transistors 52 and 54 are selected so that the voltage drop from the base-to-emitter of transistor 52 is K1 times the base-to-emitter voltage drop to transistor 54. The base of transistor 54 is connected to output terminal 50. The collector of transistor 54 is connected through a load resistor 58 to a source of positive voltage and to the base of transistor 60. The collector of NPN transistor 60 is also connected to the same source of positive voltage. The emitter of transistor 60 is connected to terminal 50. A scaling resistor 64 is connected between output terminal 50 and the emitter of transistor 66. The emitter of transistor 66 is connected through a current controlling resistor 68 to a source of negative voltage. A zener diode 70 is connected by its cathode to the base of transistor 66 and by its anode to the last named source of negative voltage. Bias resistor 72 is connected between the base of transistor 66 and the common ground terminal.

It is to be noted that the circuit operates equally well if all of the voltage polarities are reversed, if the connections to each diode are reversed, and if PNP transistors are substituted for the NPN transistors.

In operation of the circuit of FIG. 1, signals in the form of voltages may be applied to terminals V1, V2 and V3. Appropriate control signals are applied to gating diodes 3, 9, and 15 to cause only one of the signals at V1, V2 or V3 to appear at terminal 50.

Consider, for example, that it is desired to cause the signal V1 at terminal 48 to appear at terminal 50. Voltages which are more negative than any expected voltage V1, V2 or V3 are applied to terminals C2 and C3 which back-biases diodes 8, 14, 10, and 16 to block the voltages at V2 and V3. A voltage which is more positive (or less negative) than the voltage expected at V1 is applied to terminal C1. Diode 3 is reversed biased. Current, represented by arrow 38, flows from a voltage source through a resistor 5 to terminal 44. The current then divides as shown by arrows 34 and 36 to flow through diodes 2 and 4. To cause the voltage at terminal 50 to be equal to the voltage of terminal 48, the current 36 (and therefore the current represented by arrow 40) must be equal to $1/K$ times the current 34, if the voltage-current characteristic of diode 4 is such that for a given current flow its anode-cathode voltage equals K times the anode-cathode voltage of diode 2. Diodes 2 and 4 are preferably matched to cause K to equal one. If—for example—V1 is positive with respect to the ground terminal, a decrease in the magnitude of the voltage V1 tends to increase the current 34 and the voltage across diode 2. Part of the decrease in voltage appears at terminal 44 which increases current 38. Unless the voltage at terminal 46 follows V1, the current 36 tends to decrease. As the voltage at terminal 46 becomes more negative (or less positive), amplifier 22 causes the current, represented by arrow 42, to decrease. During the entire operation transistor 26 is conducting in its forward direction. A decrease in current 42 requires an increase in current 40 to cause the emitter of transistor 26 to be maintained at substantially the zener voltage of zener-diode 30. That is, the current of transistor 26 adjusts to cause the base and emitter of transistor 26 to be maintained at substantially the same potential. The values of resistors 24 and 28 can be selected and maintained constant to cause the potential at terminal 50 to be equal to the potential V1, V2 or V3 which is selected by applying control potentials to the gating diodes at C1, C2 or C3.

In operation of the unity voltage gain amplifier of FIG. 2, consider the circuit with all transistors conducting. Assume a positive voltage is applied to the base of transistor 52 with respect to the ground terminal. If the voltage applied to terminal 46 becomes less positive, the potential at the collector of transistor 66 and the emitters of transistors 52 and 54 also become less positive, the terminal 50 becomes less positive, and the collector of transistor 54 and base of transistor 60 become less positive. If the currents represented by arrows 74 and 76 are equal, and if transistors 52 and 54 are matched so that for a given current flow from their base to emitter they have the same base to emitter voltage, the voltage at terminal 50 with respect to the ground terminal is equal to the voltage at terminal 46 with respect to the ground terminal. A decrease of voltage on the base of transistor 60 causes the current represented by arrow 80 to decrease. The base and emitter of transistor 66 are maintained at substantially the same potential. The zener-diode 70 causes the base of transistor 66 to be maintained at a substantially constant voltage which, in turn, causes the emitter of transistor 66 to be maintained at a substantially constant voltage. A decrease of current 80 causes an increase of current 78. The resistance of resistor 64 is controlled to cause—for example—the increase of current 78 to be twice the increase of current 76 which causes current 74 to increase the same amount as current 76. Thus, with current 74 and 76 equal, the voltage at terminal 50 is equal to the voltage at terminal 46.

Thus, the device of this invention commutates or switches the output of the circuit to cause it to select one of a number of input voltages and faithfully to reproduce said input voltages without the introduction of errors by the switching circuit.

Although the device of this invention has been described in detail above it is to be understood that the invention is not limited by the description but only in accordance with the spirit and scope of the appended claims in which we claim:

1. A semiconductor circuit for translating a voltage signal from an input terminal to a load comprising,
first and second semiconductor signal translating devices, each comprising at least one P-N junction with first and second electrodes, connected thereto in like manner,
means for connecting said input terminal to the first electrode of said first device,
means for connecting the first electrode of said second device to said load,
means for directly connecting the second electrode of said first device to the second electrode of said second device,
biasing means comprising a constant current source connected to said first and second devices for causing said second device to transmit to said load an output voltage signal equal to a voltage signal at said input terminal, said means including a non-inverting current amplifier of substantially unity voltage gain having its input terminal coupled to the first electrode of said second device and its output terminal connected to said load for translating said output signal to said load,
and a current path from the output terminal of said amplifier to said constant current source to maintain the current through said devices equal.

2. A semiconductor circuit for translating a voltage signal from an input terminal to a load, as defined in claim 1 wherein
said semiconductor devices are diodes, and said biasing means includes a resistor connected to the second electrodes of said first and second devices connected together and said constant current source is connected to the first electrode of said second device.

3. A semiconductor circuit for translating a voltage signal from an input terminal to a load, as defined in claim 2 wherein said constant current source comprises
- a transistor having collector, emitter and base electrodes,
- means for connecting said collector electrode to the first electrode of said second device,
- a resistor connected in series with the collector emitter circuit of said transistor,
- a source of regulated voltage connected to the base electrode,
- and means for connecting said current path to said collector-emitter circuit at a point between said resistor and said first electrode of said second device.

4. A semiconductor circuit for translating a voltage signal from an input terminal to a load, as defined in claim 3 including
- a third semiconductor device comprising a diode having one electrode connected to the second electrodes of said first and second devices,
- and means for connecting the other electrode of said third device to a source of gating signals, whereby said first and second devices may be gated off by a gating signal of sufficient voltage amplitude to back bias both of said first and second devices.

5. A semiconductor circuit for translating a voltage signal from an input terminal to a load, as defined in claim 4 wherein
- said semiconductor devices are transistors of a differential amplifier, each having emitter, collector and base electrodes, and said first and second electrodes thereof comprise the base and emitter electrodes,

- and said biasing means includes a resistor connected to the collector of said second device and said constant current source is connected to the second electrodes of said first and second devices.

6. A semiconductor circuit for translating a voltage signal from an input terminal to a load, as defined in claim 5 wherein said constant current source comprises
- a third transistor having collector, emitter and base electrodes,
- means for connecting said collector electrode of said third transistor to the second electrodes of said first and second devices,
- a resistor connected in series with the collector-emitter circuit of said third transistor,
- a source of regulated voltage connected to the base electrode of said third transistor,
- and means for connecting said current path to said collector-emitter circuit at a point between said resistor and said first electrode of said second device.

7. A semiconductor circuit as defined in claim 6 wherein said non-inverting current amplifier comprises a fourth transistor having its base electrode connected to receive said output signal directly from the collector electrode of said second device, its emitter directly connected to said load and the first electrode of said second device.

References Cited by the Examiner

UNITED STATES PATENTS

| | | | |
|---|---|---|---|
| 2,535,303 | 12/50 | Lewis | 307—88.5 |
| 2,576,026 | 11/51 | Meacham | 307—88.5 |
| 2,657,318 | 10/53 | Rack | 307—88.5 |
| 2,779,872 | 6/57 | Patterson | 330—69 |
| 3,051,852 | 8/62 | Mintz et al. | 307—88.5 |
| 3,104,353 | 9/63 | Theobald | 307—88.5 |

ARTHUR GAUSS, *Primary Examiner.*